United States Patent
Watanabe

(10) Patent No.: US 6,733,192 B2
(45) Date of Patent: May 11, 2004

(54) ELECTROMAGNETIC ACTUATOR AND CAMERA BLADE DRIVING DEVICE

(75) Inventor: Nobuaki Watanabe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/601,851

(22) Filed: Jun. 24, 2003

(65) Prior Publication Data

US 2004/0062542 A1 Apr. 1, 2004

(30) Foreign Application Priority Data

Jun. 25, 2002 (JP) ........................................ 2002-183977
Apr. 2, 2003 (JP) ........................................ 2003-098822

(51) Int. Cl.$^7$ .............................................. G03B 9/08
(52) U.S. Cl. .................... 396/463; 396/493; 396/508; 310/254
(58) Field of Search ........................ 396/73, 355, 463, 396/489, 493, 508; 310/254

(56) References Cited

U.S. PATENT DOCUMENTS

| | | | | |
|---|---|---|---|---|
| 4,806,813 A | * | 2/1989 | Sumi et al. ................. | 310/254 |
| 4,897,681 A | * | 1/1990 | Yamamoto et al. ......... | 396/508 |
| 4,958,099 A | * | 9/1990 | Chigira et al. .............. | 310/254 |
| 5,155,522 A | | 10/1992 | Castor et al. | |
| 5,689,746 A | * | 11/1997 | Akada et al. ............... | 396/508 |
| 2002/0113502 A1 | * | 8/2002 | Watanabe ................... | 310/49 R |

FOREIGN PATENT DOCUMENTS

| | | |
|---|---|---|
| JP | 5-196993 | 8/1993 |
| JP | 7-56209 | 3/1995 |
| JP | 7-234434 | 9/1995 |
| JP | 7-234435 | 9/1995 |
| JP | 7-241064 | 9/1995 |
| JP | 2002-55376 | 2/2002 |
| JP | 2002-156684 | 5/2002 |
| JP | 2002-277927 | 9/2002 |

* cited by examiner

Primary Examiner—David M. Gray
(74) Attorney, Agent, or Firm—Wenderoth, Lind & Ponack, L.L.P.

(57) ABSTRACT

An electromagnetic actuator according to the present invention has a rotor magnetized to have a plurality of poles; a base rotatably supporting the rotor; a yoke having a plurality of magnetic pole portions that are formed so as to face an outer peripheral surface of the rotor and that generate different magnetic poles; a magnetizing coil; and a bobbin/presser member which is disposed on an outer periphery of the yoke, around which the coil is wound, and with which a pressing portion for pressing the yoke against the base and for supporting the rotor is formed integrally. A camera blade driving device according to the present invention has a base having an exposure opening; a shutter blade or a diaphragm blade that is rotatably supported by the base; and an electromagnetic actuator including a rotor that is magnetized to have a plurality of poles and that is rotatably supported by the base, a yoke having a plurality of magnetic pole portions that are formed so as to face an outer peripheral surface of the rotor and that generate different magnetic poles, a magnetizing coil, and a bobbin/presser member which is disposed on an outer periphery of the yoke, around which the coil is wound, and with which a pressing portion for pressing the yoke against the base and for supporting the rotor is formed integrally, the electromagnetic actuator driving the shutter blade or the diaphragm blade. Accordingly, the parts count is reduced, and the assembly task is simplified, while cost is lowered.

15 Claims, 16 Drawing Sheets

ELECTROMAGNETIC ACTUATOR AND CAMERA BLADE DRIVING DEVICE

BACKGROUND OF THE INVENTION

1. Field of the Invention

The present invention relates to an electromagnetic actuator that generates a driving force by an electromagnetic force, and, more particularly, relates to an electromagnetic actuator used when a shutter blade or a diaphragm blade of a camera is driven to rotate within a predetermined angular range, and relates to a camera blade driving device that is driven by the electromagnetic actuator and is provided with a shutter blade used to block all light passing through an exposure opening or a diaphragm blade used to block part of the light.

2. Description of the Related Art

In order to drive a shutter blade or a diaphragm blade, a conventional electromagnetic actuator mounted in a camera-blade-driving device, such as a camera shutter device or a camera diaphragm device, is made up of a rotor 2 supported rotatably with respect to a base 1 having an exposure opening 1a, a lower yoke 3 and an upper yoke 4 that have magnetic pole portions disposed to face an outer peripheral surface of the rotor 2, a bobbin 6 around which a coil 5 is wound, a presser plate 7 for holding down the lower yoke 3 and upper yoke 4 and rotatably supporting the rotor 2, and screws 8 by which the presser plate 7 is fastened to the base 1, as shown in FIG. 1.

In order to assemble the electromagnetic actuator, the rotor 2 is first attached rotatably to a supporting shaft 1b of the base 1. Next, linear parts 3a and 4a are then inserted into an engagement hole 6a of the bobbin 6 while laying the lower yoke 3 and upper yoke 4 on each other, and the bobbin 6 around which the coil 5 is wound is incorporated thereinto so as to form a module.

Thereafter, this modularized component is fixed to a predetermined position of the base 1, the presser plate 7 is then placed thereon, the screw 8 is then screwed to a screw hole 1c of the base 1, and the presser plate 7 is fastened to the base 1. Thus, the electromagnetic actuator serving as a driving source in the camera blade driving device is completely incorporated thereinto (Japanese Unexamined Patent Publication No. 2002-156684, for example).

Furthermore, in the electromagnetic actuator constructed as mentioned above, the lower yoke 3 and upper yoke 4 are attached to the bobbin 6, and, after that, the whole is fixed by use of the presser plate 7 that has been formed as an independent part. Therefore, the assembly task is complex, and the number of components is large, thereby causing an increase in component management costs, in manufacturing costs, etc.

The present invention has been made in consideration of the problems of the conventional technique. It is therefore an object of the present invention to provide an electromagnetic actuator capable of reducing the number of components, capable of simplifying the assembly task, capable of reducing costs, capable of simplifying a structure, etc., and to provide a camera blade driving device that includes a shutter blade or a diaphragm blade driven by this electromagnetic actuator.

SUMMARY OF THE INVENTION

An electromagnetic actuator of the present invention that achieves the object has a rotor magnetized to have a plurality of poles, a base rotatably supporting the rotor, a yoke having a plurality of magnetic pole portions that are formed so as to face an outer peripheral surface of the rotor and that generate different magnetic poles, a magnetizing coil, and a bobbin/presser member which is disposed on an outer periphery of the yoke, around which the coil is wound, and with which a pressing portion for pressing the yoke against the base and for supporting the rotor is formed integrally.

According to this structure, since the bobbin and the pressing portion are formed integrally with each other, the parts count is reduced, and, proportionally thereto, man-hours or labor hours to handle the components can be saved, an assembly task can be simplified, and costs can be lowered.

In the electromagnetic actuator constructed as mentioned above, the yoke may have two magnetic pole portions and be shaped substantially like a "U" including a straight part that has one of the two magnetic pole portions at its end, and the bobbin may have an engagement hole into which the straight part is fitted.

According to this structure, after the yoke is inserted into the engagement hole of the bobbin so as to be united together, the united pieces can be positioned and fixed directly to the base. Therefore, assembling time (step) can be saved, and the assembly task can be more easily performed than in the conventional manner in which the constituent parts formed individually are positioned and fixed individually to the base.

In the electromagnetic actuator constructed as mentioned above, the pressing portion may be formed so as to extend from both ends of the bobbin.

According to this structure, since the pressing portion is fixed to the base at both sides between which the bobbin is placed, they can be firmly assembled while the parts count is reduced or the assembly task is simplified.

In the electromagnetic actuator constructed as mentioned above, the pressing portion may be formed so as to extend from one end of the bobbin.

According to this structure, the bobbin/presser member that unitedly has the bobbin and the pressing portion can be reduced in size, can be simplified in structure, and can be reduced in weight.

A second electromagnetic actuator of the present invention that achieves the object has a base, a rotor rotatably supported by the base and magnetized to have a plurality of poles, a nearly U-shaped yoke disposed on the base so as to face an outer peripheral surface of the rotor, a magnetizing coil, and a bobbin including a portion around which the coil disposed on one side of the yoke is wound and a portion holding the yoke and the rotor so as not to fall off the base.

According to this structure, the bobbin around which the coil is wound holds the yoke and the rotor so as not to fall off the base. Therefore, the parts count is reduced, and proportionally thereto, man-hours or labor hours to handle the components can be saved, an assembly task can be simplified, and costs can be lowered.

A camera blade driving device of the present invention that achieves the object has a base having an exposure opening, a shutter blade that is rotatably supported by the base and that opens and closes the opening, and an electromagnetic actuator including a rotor that is magnetized to have a plurality of poles and that is rotatably supported by the base, a yoke having a plurality of magnetic pole portions that are formed to face an outer peripheral surface of the rotor and that generate different magnetic poles, a magnetizing coil, and a bobbin/presser member which is disposed on an outer periphery of the yoke, around which the coil is wound, and with which a pressing portion for pressing the yoke against the base and for supporting the rotor is formed integrally, the electromagnetic actuator driving the shutter blade.

According to this structure, since the bobbin and the pressing portion of the electromagnetic actuator that drives the shutter blade are formed integrally with each other, and since the single base supports the rotor and the shutter blade, the parts count is reduced, and, proportionally thereto, the man-hours or labor hours to handle the components can be saved, the assembly task can be simplified, the structure can be simplified, and device costs can be lowered.

In the camera blade driving device constructed as mentioned above, the yoke may have two magnetic pole portions and be shaped substantially like a "U" including a straight part that has one of the two magnetic pole portions at its end, and the bobbin may have an engagement hole into which the straight part is fitted.

According to this structure, after the yoke is inserted into the engagement hole of the bobbin so as to be united together, the united pieces can be positioned and fixed directly to the base. Therefore, assembling time (step) can be saved, and the assembly task can be more easily performed than in the conventional manner in which the constituent parts formed individually are positioned and fixed individually to the base.

In the camera blade driving device constructed as mentioned above, the pressing portion may be formed so as to extend from both ends of the bobbin.

According to this structure, since the pressing portion is fixed to the base at both sides between which the bobbin is placed, they can be firmly assembled while the parts count is reduced or the assembly task is simplified.

In the camera blade driving device constructed as mentioned above, the pressing portion may be formed so as to extend from one end of the bobbin.

According to this structure, the bobbin/presser member that unitedly has the bobbin and the pressing portion can be reduced in size, can be simplified in structure, and can be reduced in weight.

A second camera blade driving device of the present invention that achieves the object has a base having an exposure opening, a diaphragm blade that is rotatably supported by the base and that adjusts (or limits) the amount of light passing through the opening, and an electromagnetic actuator including a rotor that is magnetized to have a plurality of poles and that is rotatably supported by the base, a yoke having a plurality of magnetic pole portions that are formed to face an outer peripheral surface of the rotor and that generate different magnetic poles, a magnetizing coil, and a bobbin/presser member which is disposed on an outer periphery of the yoke, around which the coil is wound, and with which a pressing portion for pressing the yoke against the base and for supporting the rotor is formed integrally, the electromagnetic actuator driving the diaphragm blade.

According to this structure, since the bobbin and the pressing portion of the electromagnetic actuator that drives the diaphragm blade are formed integrally with each other, and since the single base supports the rotor and the diaphragm blade, the parts count is reduced, and, proportionally thereto, the man-hours or labor hours to handle the components can be saved, an assembly task can be simplified, the structure can be simplified, and device costs can be lowered.

In the second camera blade driving device constructed as mentioned above, the yoke may have two magnetic pole portions and be shaped substantially like a "U" including a straight part that has one of the two magnetic pole portions at its end, and the bobbin may have an engagement hole into which the straight part is fitted, and the diaphragm blade may have a blade that defines an aperture with a predetermined hole diameter and an ND filter that is joined to the blade so as to cover at least this aperture and by which the amount of light is reduced.

According to this structure, after the yoke is inserted into the engagement hole of the bobbin so as to be united together, the united pieces can be positioned and fixed directly to the base. Therefore, assembling time (step) can be saved, and the assembly task can be more easily performed than in the conventional manner in which the constituent parts formed individually are positioned and fixed individually to the base.

When the diaphragm blade is driven by the electromagnetic actuator and is caused to face the opening, if the aperture is greater than the exposure opening, the amount of light passing through the opening is reduced only by the operation of the ND filter, and, if the aperture is a diaphragm aperture smaller than the exposure opening, the amount of light passing through the opening can be reduced both by the operation of the diaphragm aperture and by the operation of the ND filter.

In the second camera blade driving device constructed as mentioned above, the diaphragm blade may have a pair of blades, and the ND filter may be joined while being placed between the pair of blades.

According to this structure, since a layered structure exists in which the ND filter is placed between the pair of blades, the mechanical strength of the diaphragm blade can be increased, and the ND filter can be prevented from being scratched.

In the second camera blade driving device constructed as mentioned above, the ND filter may be joined to a surface on one side of the blade.

According to this structure, since the ND filter is merely joined so as to cover at least the aperture, the diaphragm blade can be reduced in weight and in thickness, and, accordingly, the device can be thinned.

In the second camera blade driving device constructed as mentioned above, the yoke may have two magnetic pole portions and be shaped substantially like a "U" including a straight part that has one of the two magnetic pole portions at its end, and the bobbin may have an engagement hole into which the straight part is fitted, and the diaphragm blade may have a diaphragm aperture smaller in hole diameter than the exposure opening.

According to this structure, after the yoke is inserted into the engagement hole of the bobbin so as to be united together, the united pieces can be positioned and fixed directly to the base. Therefore, assembling time (step) can be saved, and the assembly task can be more easily performed than in the conventional manner in which the constituent parts formed individually are positioned and fixed individually to the base. Furthermore, when the diaphragm blade is driven by the electromagnetic actuator and is caused to face the opening, the amount of light passing through the opening can be reduced by the diaphragm aperture.

In the second camera blade driving device constructed as mentioned above, the pressing portion may be formed so as to extend from both ends of the bobbin.

According to this structure, since the pressing portion is fixed to the base at both sides between which the bobbin is placed, they can be firmly assembled while the parts count is reduced or the assembly task is simplified.

DETAILED DESCRIPTION OF THE PREFERRED EMBODIMENTS

Preferred embodiments of the present invention will hereinafter be described with reference to the accompanying drawings.

Figure 2:
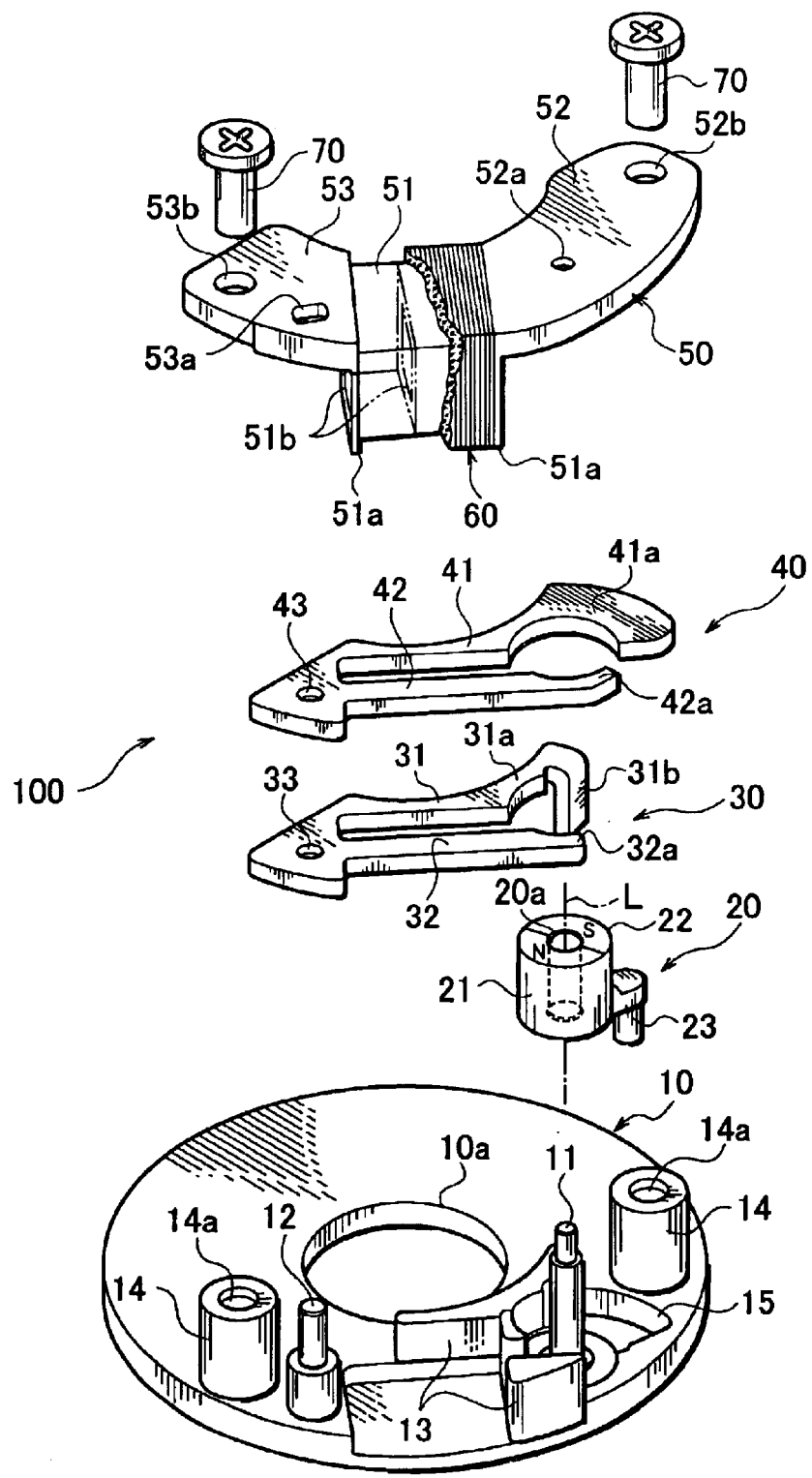
FIG. 2 is an exploded perspective view that shows an embodiment of an electromagnetic actuator according to the present invention.

FIG. 2 shows one embodiment of an electromagnetic actuator according to the present invention.

As shown in FIG. 2, the electromagnetic actuator 100 includes a disk-shaped base 10, a rotor 20 rotatably supported by the base 10, a lower yoke 30, an upper yoke 40, a bobbin/presser member 50 that unitedly has a bobbin 51 and pressing portions 52 and 53, a magnetizing coil 60 wound around the bobbin 51, and a screw 70 that fastens the bobbin/presser member 50 to the base 10.

The base 10 serves as a part of a camera blade driving device, and, as shown in FIG. 2, has an exposure opening 10a, a supporting shaft 11 that supports the rotor 20, a pin 12 and a wall part 13 by both of which the lower yoke 30 and upper yoke 40 are positioned, connection parts 14 each of which has a screw hole 14a into which the screw 70 is screwed, and a notch hole 15 through which a driving pin 23 of the rotor 20, described later, passes.

As shown in FIG. 2, the rotor 20 has a through-hole 20a in its central part, and is magnetized to have N and S poles with a boundary plane passing through a rotational center axis L therebetween. The rotor 20 further has an outer peripheral surface 21 of the N pole and an outer peripheral surface 22 of the S pole that are halved at the boundary plane, and a driving pin 23 projecting outward in the radial direction and further extending downward. The driving pin 23 transmits the rotational driving force of the rotor 20 to the outside, and is magnetized to wholly have an S pole, whereby a magnetic attraction force and a magnetic repulsion force are generated in cooperation with an auxiliary pole piece 31b described later.

As shown in FIG. 2, the lower yoke 30 is shaped substantially like the letter U and like a plate having a curved part 31 and a straight part 32, and has a positioning hole 33 in its bent region. The end of the curved part 31 has a first magnetic pole portion 31a that faces the outer peripheral surface of the rotor 20 and the auxiliary pole piece 31b that is bent almost vertically. The auxiliary pole piece 31b serves to generate a magnetic attraction force and a magnetic repulsion force in relation to the driving pin 23. The end of the straight part 32 has a second magnetic pole portion 32a that faces the outer peripheral surface of the rotor 20.

As shown in FIG. 2, the upper yoke 40 is shaped substantially like the letter U and like a plate having a curved part 41 and a straight part 42, and has a positioning hole 43 in its bent region. The end of the curved part 41 has a first magnetic pole portion 41a that faces the outer peripheral surface of the rotor 20. The end of the straight part 42 has a second magnetic pole portion 42a that faces the outer peripheral surface of the rotor 20.

As shown in FIG. 2, the bobbin/presser member 50 is integrally made of a resinous material, or the like, so as to have a bobbin 51 whose cross section is substantially rectangularly cylindrical and two pressing portions 52 and 53 that extend horizontally from both ends of the bobbin 51.

As shown in FIG. 2, the bobbin 51 has ribs 51a at both ends thereof and an engagement hole 51b, whose cross section is substantially rectangular, in the inside thereof. The straight part 32 of the lower yoke 30 and the straight part 42 of the upper yoke 40 are inserted into the engagement hole 51b while being laid on each other, so that the lower yoke 30 and the upper yoke 40 can be firmly held. The coil 60 is wound on the outer peripheral region of the bobbin 51 placed between both of the ribs 51a.

The pressing portion 52 is shaped like a flat plate and has an engagement hole 52a, through which the supporting shaft 11 of the base 10 passes, at the halfway position thereon and a hole 52b, through which the screw 70 passes, at the end thereof The pressing portion 53 is shaped like a flat plate and has a substantially rectangular hole 53a, through which the pin 12 of the base 10 passes, at the halfway position thereon and a hole 53b, through which the screw 70 passes, at the end thereof.

In order to assemble the electromagnetic actuator 100 constructed as mentioned above, the rotor 20 is first attached rotatably to the supporting shaft 11. Thereafter, the coil 60 is wound around the bobbin 51 of the bobbin/presser member 50.

Thereafter, the straight parts 32 and 42 are inserted into the engagement hole 51b of the bobbin 51 while laying the lower yoke 30 and the upper yoke 40 on each other. Thereby, the lower yoke 30 and the upper yoke 40 are firmly held to the bobbin/presser member 50. Herein, the coil 60 may be wound after the lower yoke 30 and upper yoke 40 are inserted thereinto.

Thus, the coil 60, the lower yoke 30, and the upper yoke 40 are incorporated into the bobbin/presser member 50, and, as a result, a module is formed.

Thereafter, in such a manner that the pin 12 of the base 10 passes through the positioning holes 33 and 43 and the hole 53a, and then the curved parts 31 and 41 and the straight parts 32 and 42 are positioned inside the wall parts 13, and then the tip of the supporting shaft 11 is fitted into the engagement hole 52a, the module (the coil 60, the lower yoke 30, the upper yoke 40, and the bobbin/presser member 50) is disposed on the base 10 and the pressing portions 52 and 53 are fastened to the connection parts 14 with the screw 70. Thereby, the assembling of the electromagnetic actuator 100 is completed.

Thus, upon assembly, since the lower and upper yokes 30 and 40 and the bobbin/presser member 50 around which the coil 60 is wound are simultaneously positioned to the base 10, the assembly task can be more simply performed than in the manner in which they are assembled by being individually positioned. Additionally, since the bobbin 51 and the pressing portions 52 and 53 are integrally formed, the parts count can be reduced, the management cost of components can be lowered, and product cost can be lowered more than in the conventional manner in which they are formed as individually separated components.

Figure 3:
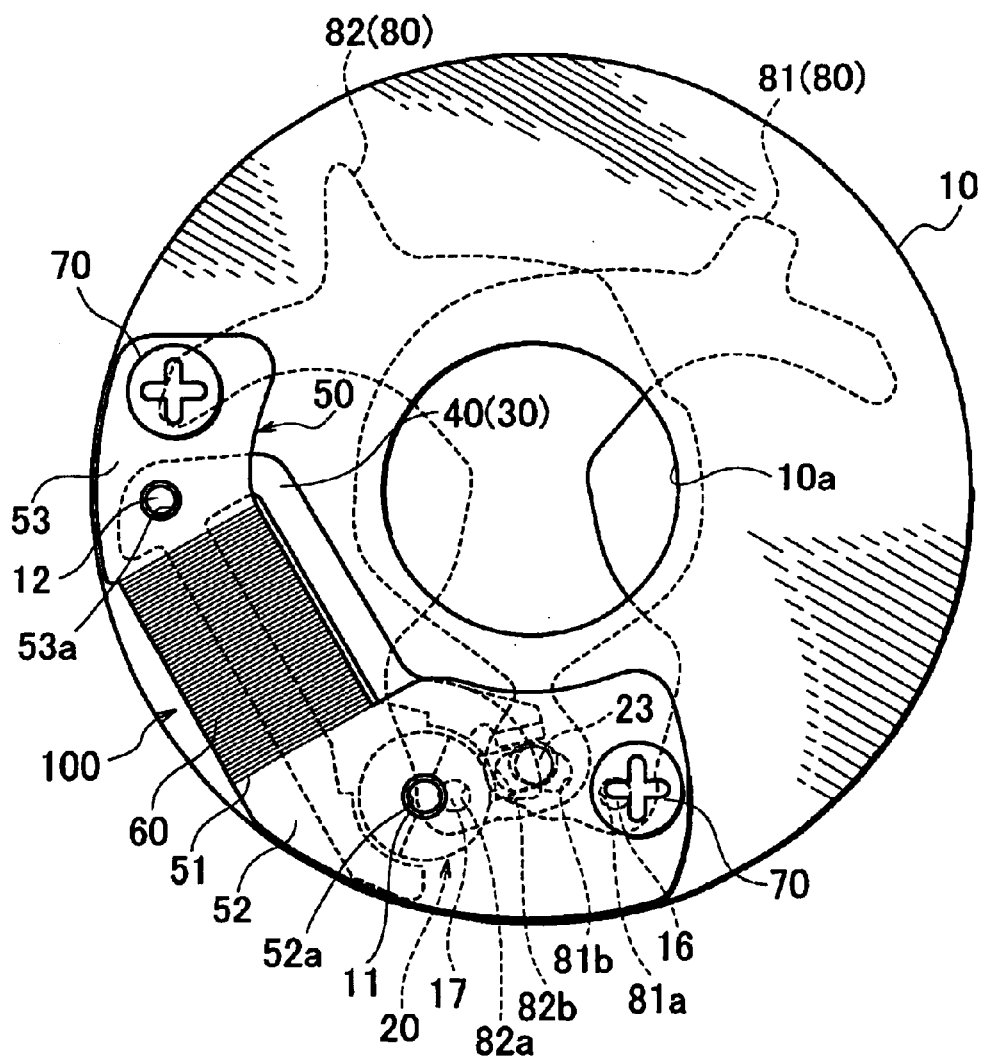
FIG. 3 is a plan view that shows an embodiment of a camera blade driving device that has a shutter blade driven by the electromagnetic actuator according to the present invention.
Figure 4:
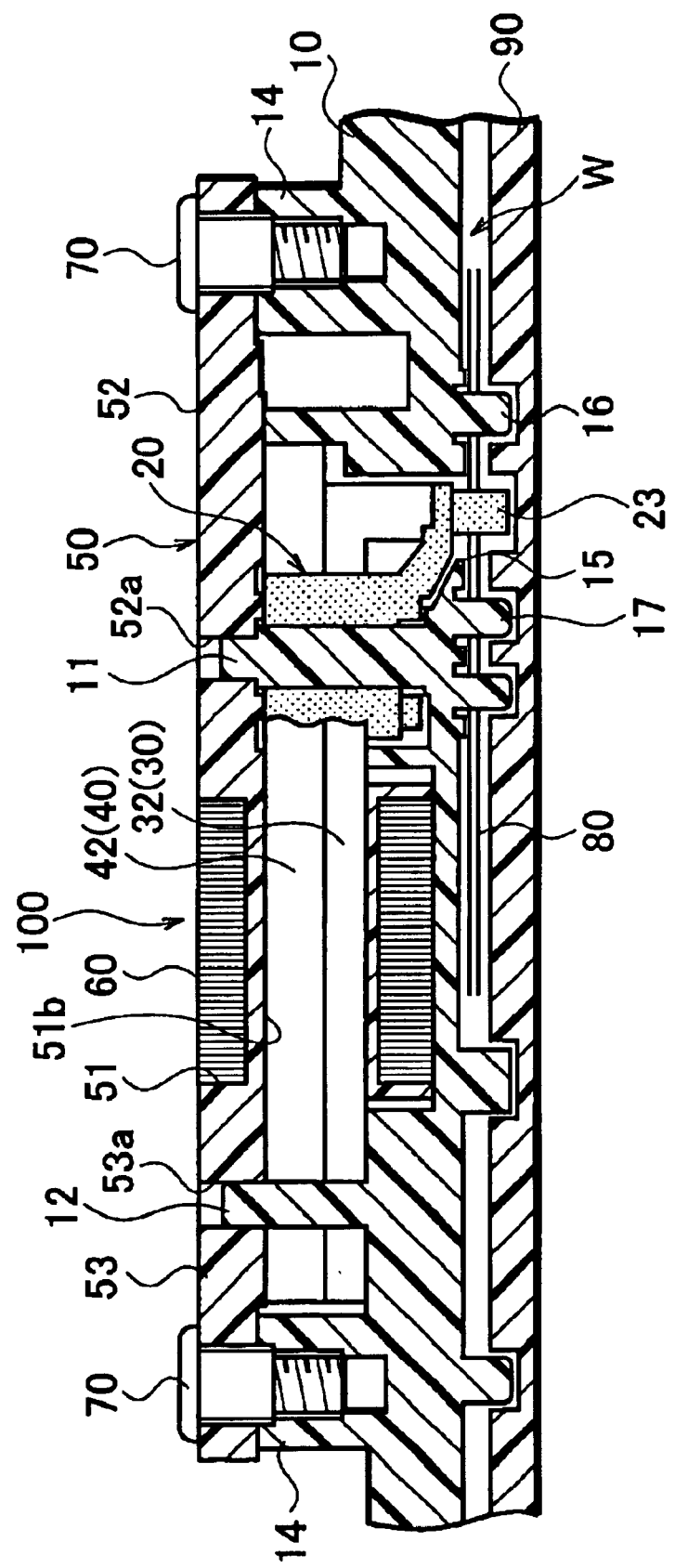
FIG. 4 is an expanded sectional view that shows a part of the camera blade driving device shown in FIG. 3.

FIG. 3 and FIG. 4 show an embodiment of a camera blade driving device (camera shutter device) that has the electromagnetic actuator 100 shown in FIG. 2. As shown in FIG. 3 and FIG. 4, the camera blade driving device includes the aforementioned base 10, a pair of shutter blades 80 (81, 82) reciprocatively provided to open or close the opening 10a, a back plate 90 with which the shutter blade 80 is covered, and the aforementioned electromagnetic actuator 100 serving as a driving source that drives the shutter blade 80.

The base 10 has supporting shafts 16 and 17 that rotatably support the shutter blade 80 on the back side thereof, in addition to the aforementioned constituent parts.

In greater detail, the rotor 20 is rotatably supported by the base 10 (supporting shaft 11) and the bobbin/presser member 50 (pressing portion 52) so as not to fall off as shown in FIG. 4, and the driving pin 23 extends through the notch hole 15 to a blade chamber W formed between the base 10 and the back plate 90.

As shown in FIG. 3, the shutter blade 80 consists of a first shutter blade 81 and a second shutter blade 82. The shutter blades 81 and 82 have holes 81a and 82a through which the supporting shafts 16 and 17 pass and long holes 81b and 82b through which the driving pins 23 pass. That is, the shutter blades 81and 82 are reciprocatively supported by the supporting shafts 16 and 17, respectively. When the rotor 20 (the driving pin 23) rotates clockwise in FIG. 3, the shutter blades 81 and 82 rotate in directions in which they are separated from each other so as to open the opening 10a, whereas, when the rotor 20 (the driving pin 23) rotates counterclockwise, they rotate in directions in which they come closer to each other so as to close the opening 10a as shown in FIG. 3.

In the camera blade driving device, the electromagnetic actuator 100 is employed as a driving source, and therefore the cost of the entire device can be reduced. Additionally, for example, when the electromagnetic actuator 100 is replaced with another, the replacement task can be performed more simply and more easily than in the conventional manner, because the number of constituent parts is smaller than in the prior art device.

Figure 5:
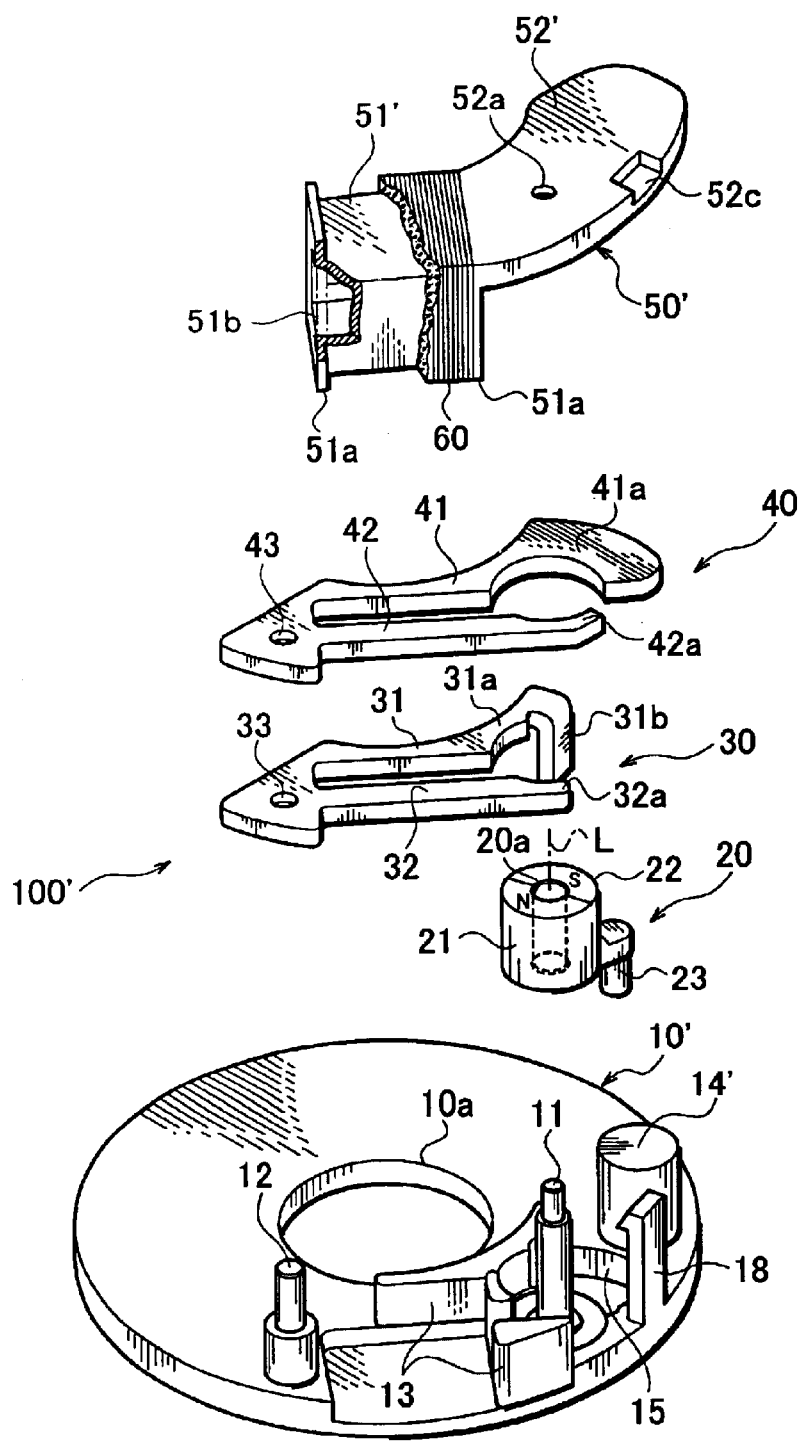
FIG. 5 is an exploded perspective view that shows another embodiment of the electromagnetic actuator according to the present invention.

FIG. 5 shows another embodiment of the electromagnetic actuator according to the present invention, in which the same reference characters are given the same constituent parts, respectively, as those in the foregoing embodiment, and a description thereof is omitted. As shown in FIG. 5, the electromagnetic actuator 100' includes a base 10', a rotor 20 rotatably supported by the base 10', a lower yoke 30, an upper yoke 40, a bobbin/presser member 50' that unitedly has a bobbin 51' and a pressing portion 52', and a magnetizing coil 60 wound around the bobbin 51'.

The base 10' serves as a part of a camera blade driving device, and has an opening 10a, a supporting shaft 11, a pin 12 and a wall part 13, a notch hole 15, a projection 14' that supports the bobbin/presser member 50', and a hook 18 that fixes the bobbin/presser member 50'.

As shown in FIG. 5, the bobbin/presser member 50' is integrally made of a resinous material, or the like, so as to have a bobbin 51' whose cross section is substantially rectangularly cylindrical and a pressing portion 52' that extends horizontally from one end of the bobbin 51'.

As shown in FIG. 5, the bobbin 51' has ribs 51a at both ends thereof and an engagement hole 51b, whose cross section is substantially rectangular, in the inside thereof. As mentioned above, the straight part 32 of the lower yoke 30 and the straight part 42 of the upper yoke 40 are inserted into the engagement hole 51b while being laid on each other, so that the lower yoke 30 and the upper yoke 40 can be firmly held.

The pressing portion 52' is shaped like a flat plate and has an engagement hole 52a at the halfway position thereon and a concave part 52c, which is used to catch the hook 18 of the base 10', at the edge thereof.

In order to assemble the electromagnetic actuator 100' constructed as mentioned above, the rotor 20 is first attached rotatably to the supporting shaft 11. Thereafter, the coil 60 is wound around the bobbin 51' of the bobbin/presser member 50'.

Thereafter, the straight parts 32 and 42 are inserted into the engagement hole 51b of the bobbin 51' while laying the lower yoke 30 and the upper yoke 40 on each other. Thereby, the lower yoke 30 and the upper yoke 40 are firmly held to the bobbin/presser member 50'. Herein, the coil 60 may be wound after the lower yoke 30 and upper yoke 40 are inserted thereinto.

Thus, the coil 60, the lower yoke 30, and the upper yoke 40 are incorporated into the bobbin/presser member 50', and, as a result, a module is formed.

Thereafter, in such a manner that the pin 12 of the base 10' passes through the positioning holes 33 and 43, and then the curved parts 31 and 41 and the straight parts 32 and 42 are positioned inside the wall parts 13, and then the tip of the supporting shaft 11 is fitted into the engagement hole 52a, the module (the coil 60, the lower yoke 30, the upper yoke 40, and the bobbin/presser member 50') is disposed on the base 10' and the hook 18 is caught by the concave part 52c of the pressing portion 52'. Thereby, the assembling of the electromagnetic actuator 100' is completed.

In order to fix the module firmly to the base 10', an adhesive, such as epoxy resin, may be applied onto the surface of the pin 12 projecting from the hole 43 of the upper yoke 40.

Thus, upon assembly, since the lower yoke 30 and upper yoke 40 and the bobbin/presser member 50' around which the coil 60 is wound are simultaneously positioned to the base 10', the assembly task can be more simply performed than in the manner in which they are assembled by being individually positioned.

Additionally, Since the bobbin 51' and the pressing portion 52' are integrally formed, the parts count can be reduced, the management cost of components can be lowered, and product cost can be lowered more than in the conventional manner in which they are formed as individually separated components. Additionally, the bobbin/presser member 50' can be made simpler in structure, can be made lighter in weight, and can be made smaller in size than the aforementioned bobbin/presser member 50.

Figure 6:
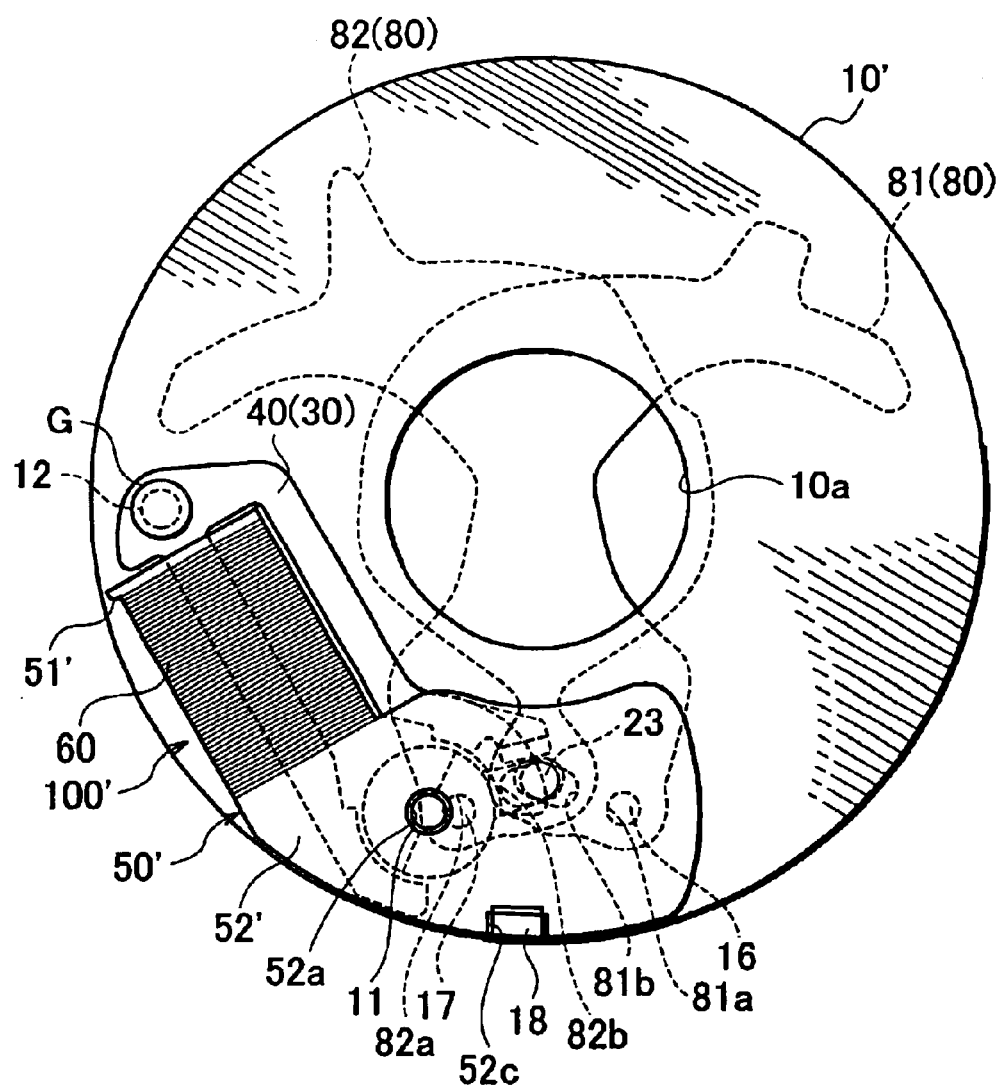
FIG. 6 is a plan view that shows another embodiment of the camera blade driving device that has a shutter blade driven by the electromagnetic actuator shown in FIG. 5.
Figure 7:
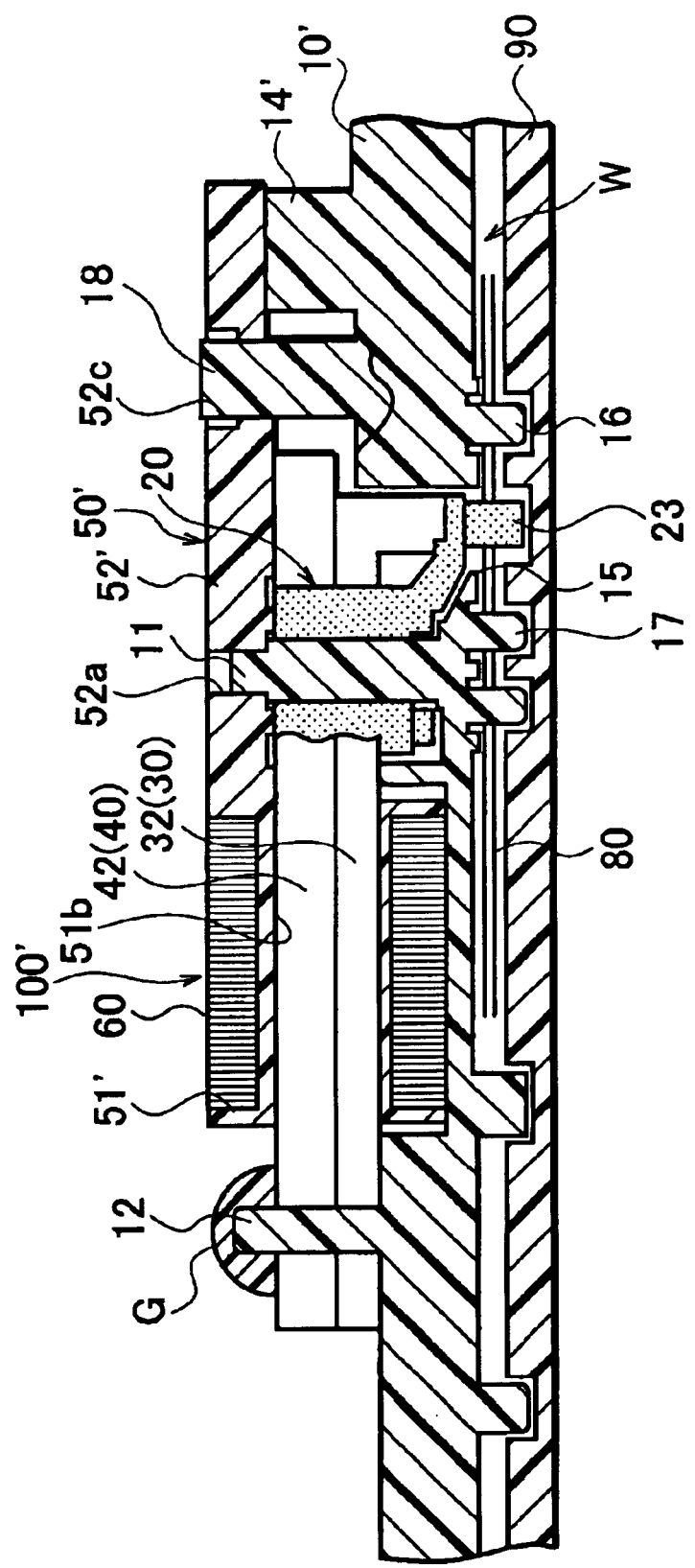
FIG. 7 is an expanded sectional view that shows a part of the camera blade driving device shown in FIG. 6.

FIG. 6 and FIG. 7 show another embodiment of the camera blade driving device (camera shutter device) that has the electromagnetic actuator 100' shown in FIG. 5, in which the same reference characters are given the same constituent parts as those in the embodiment shown in FIG. 3 and FIG. 4, and a description thereof is omitted. As shown in FIG. 6 and FIG. 7, the camera blade driving device includes the base 10', a pair of shutter blades 80 (81, 82) reciprocatively provided to open or close the opening 10a, a back plate 90 with which the shutter blade 80 is covered, and the aforementioned electromagnetic actuator 100' serving as a driving source that drives the shutter blade 80.

In greater detail, the rotor 20 is rotatably supported by the base 10' (supporting shaft 11) and the bobbin/presser member 50' (pressing portion 52') so as not to fall off as shown in FIG. 7, and the driving pin 23 extends through the notch hole 15 to a blade chamber W formed between the base 10', and the back plate 90.

Herein, the electromagnetic actuator 100' is joined to the base 10', and, after that, an adhesive G, such as epoxy resin, is applied onto the surface of the pin 12 projecting from the hole 43 of the upper yoke 40 as shown in FIG. 6 and FIG. 7. As a result, the electromagnetic actuator 100' is fixed more firmly to the base 10'.

Likewise, in this camera blade driving device, the electromagnetic actuator 100' is employed as a driving source, and therefore the cost of the entire device can be reduced. Additionally, since the number of constituent parts is smaller than in the prior art device, for example, when the electromagnetic actuator 100' is replaced with another, the replacement task can be performed more simply and more easily than in the conventional manner, and, if the adhesive G is not used, the replacement task can be performed much more easily.

In the aforementioned embodiments, the electromagnetic actuator 100 (100') having the lower yoke 30 and upper yoke 40 employs the bobbin/presser member 50 (50') in which the bobbin 51 (51') and the pressing portions 52 and 53 (52') are integrally formed. However, without being limited to this, a structure including a single yoke may be employed as the structure of the present invention.

Further, in the aforementioned embodiments, there is shown the camera blade driving device that employs the electromagnetic actuator 100 (100') according to the present invention as a driving source that drives the pair of shutter blades 80. However, without being limited to this, the electromagnetic actuator 100 (100') according to the present invention may be employed as a driving source that drives a single shutter blade.

Figure 1:
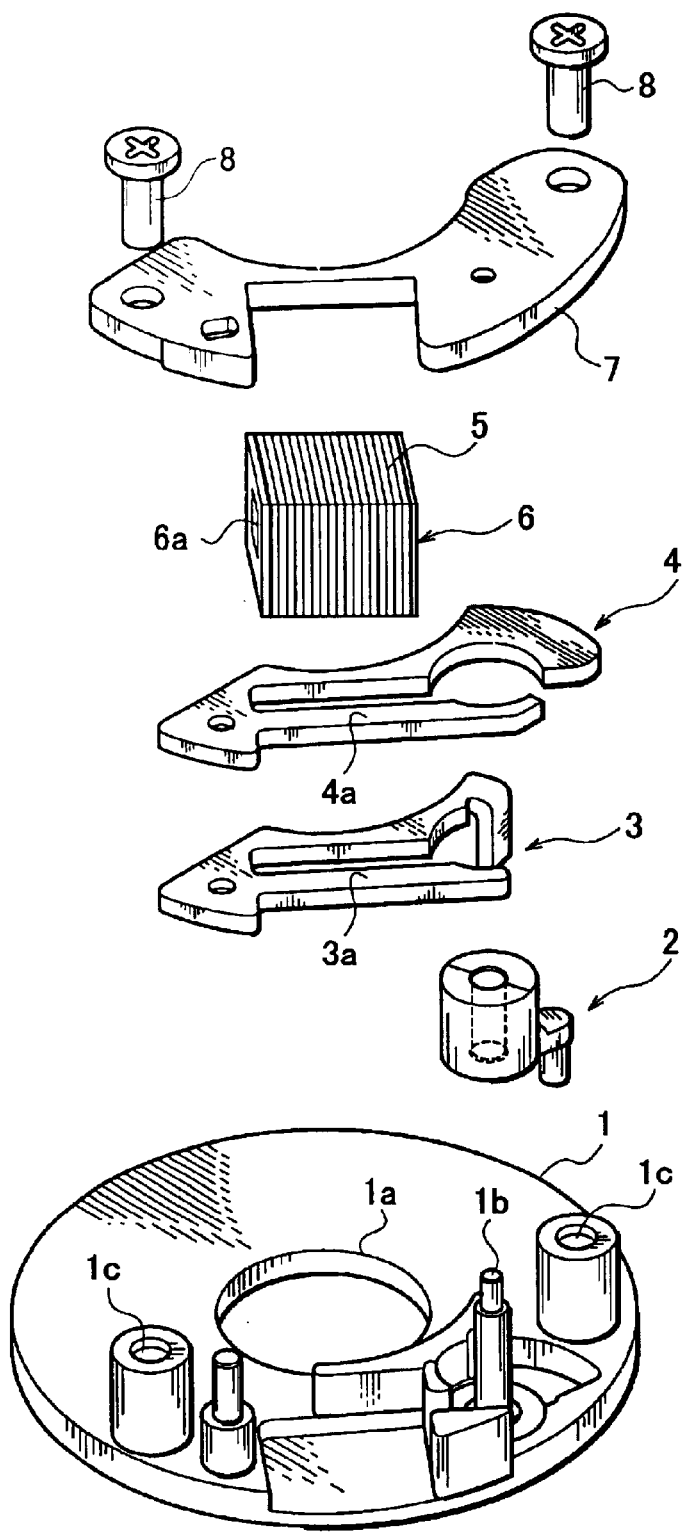
FIG. 1 is an exploded perspective view that shows a conventional electromagnetic actuator.

FIG. 8 through FIGS. 11A and 11B show another embodiment of the camera blade driving-device (camera diaphragm device) that has the electromagnetic actuator 100 shown in FIG. 1, in which the same reference characters are given the same constituent parts as those in the embodiment shown in FIG. 3 and FIG. 4, and a description thereof is omitted.

Figure 8:
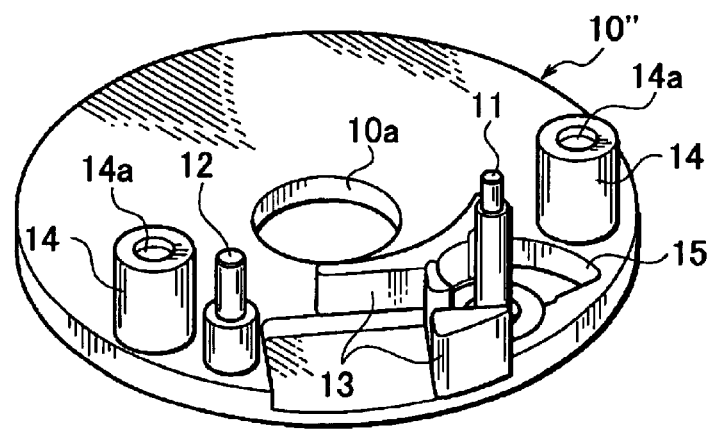
FIG. 8 shows another embodiment of the camera blade driving device according to the present invention, being an exploded perspective view that shows a diaphragm blade serving as a part of the device and that shows a structure in the vicinity thereof.
Figure 8:
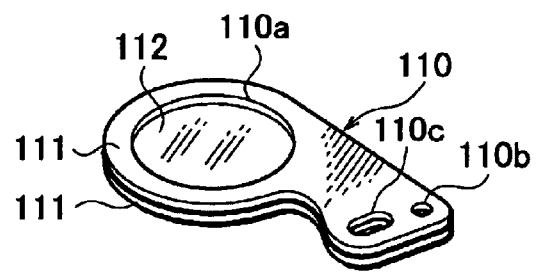
Figure 8:
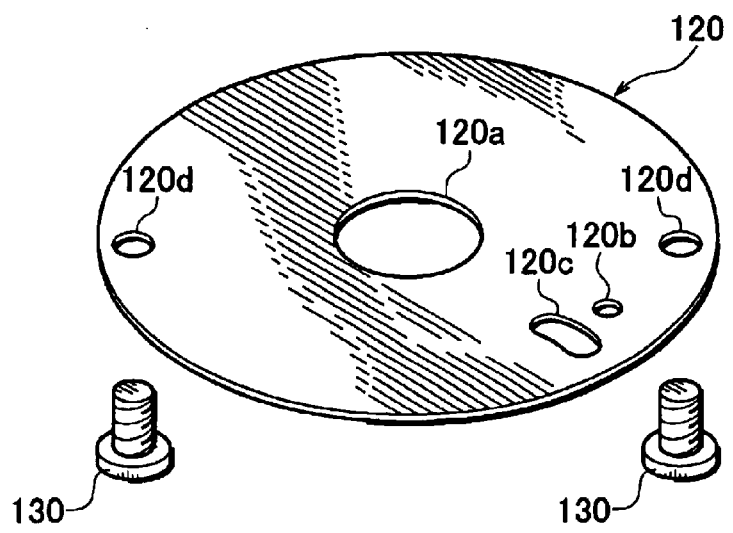
Figure 9:
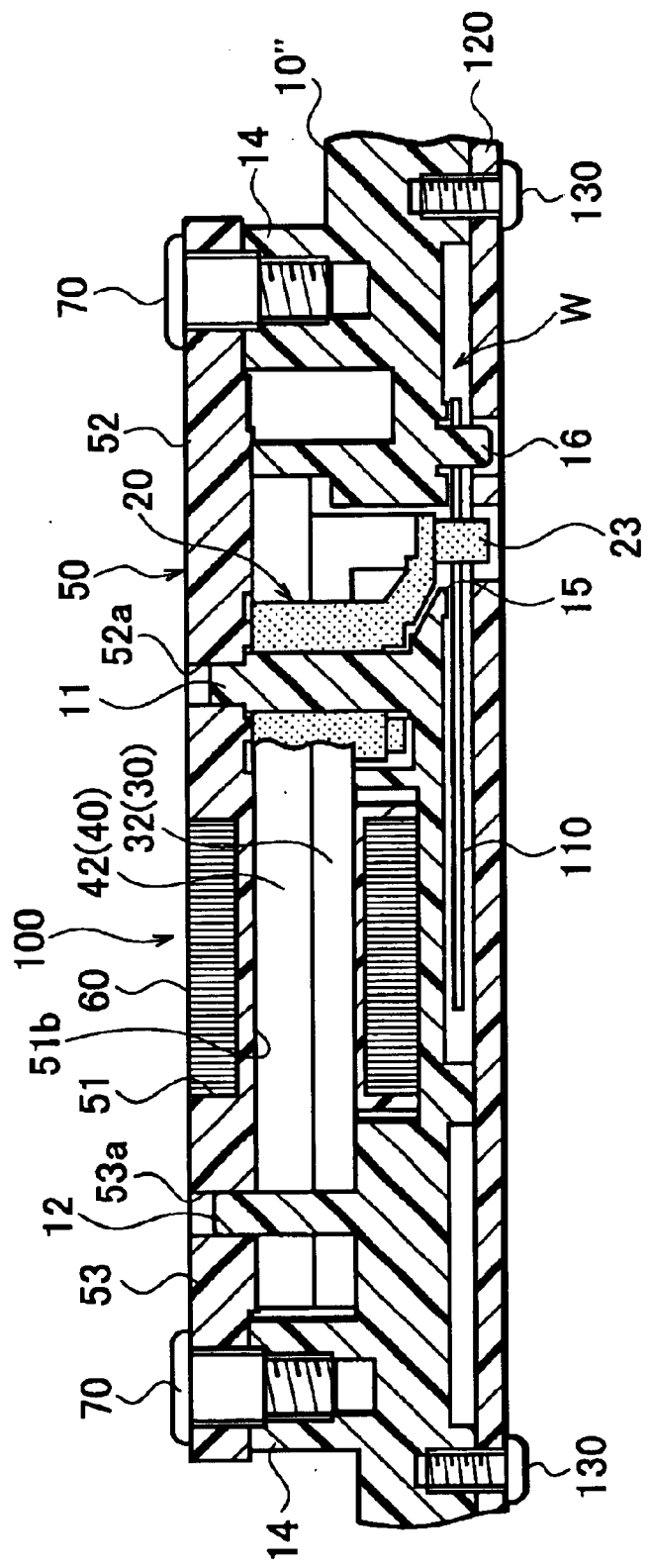
FIG. 9 is an expanded sectional view that shows a part of the camera blade driving device that has the diaphragm blade driven by the electromagnetic actuator shown in FIG. 1.

As shown in FIG. 8 and FIG. 9, this camera blade driving device includes a base 10" that has an exposure opening 10a, a diaphragm blade 110 that is rotatably supported by the base 10" and that adjusts (or limits) the amount of light passing through the: opening 10a, a back plate 120 with which the diaphragm blade 110 is covered, and an electromagnetic actuator 100 that drives the diaphragm blade 11 and that includes a rotor 20, a lower yoke 30, an upper yoke 40, a bobbin/presser member 50, a magnetizing coil 60, and a screw 70 by which the bobbin/presser member 50 is fastened to the base 10".

As shown in FIG. 8 and FIG. 9, the base 10" has an exposure opening 10a, a supporting shaft 11 that supports the rotor 20, a pin 12 and a wall part 13 by both of which the lower yoke 30 and upper yoke 40 are positioned, connection parts 14 each of which has a screw hole 14a into which the screw 70 is screwed, and a notch hole 15 through which a driving pin 23 of the rotor 20, described later, passes. As shown in FIG. 9, the base 10" further has a supporting shaft 16 that rotatably supports the diaphragm blade 110 on the back side thereof.

In order to assemble the electromagnetic actuator 100, as mentioned above, the rotor 20 is first attached rotatably to the supporting shaft 11, the coil 60 is then wound around the bobbin 51 of the bobbin/presser member 50, and the straight parts 32 and 42 are inserted into the engagement hole 51b of the bobbin 51 while laying the lower yoke 30 and the upper yoke 40 on each other. Thereby, the lower yoke 30 and the upper yoke 40 are firmly held to the bobbin/presser member 50. Herein, the coil 60 may be wound after the lower yoke 30 and upper yoke 40 are inserted thereinto.

Thus, the coil 60, the lower yoke 30, and the upper yoke 40 are incorporated into the bobbin/presser member 50, and, as a result, a module is formed.

Thereafter, in such a manner that the pin 12 of the base 10" passes through the positioning holes 33 and 43 and the hole 53a, and then the curved parts 31 and 41 and the straight parts 32 and 42 are positioned inside the wall parts 13, and then the tip of the supporting shaft 11 is fitted into the engagement hole 52a, the module (the coil 60, the lower yoke 30, the upper yoke 40, and the bobbin/presser member 50) is disposed on the base 10" and the pressing portions 52 and 53 are fastened to the connection parts 14 with the screw 70. Thereby, the assembling of the electromagnetic actuator 100 is completed.

Thus, upon assembly, since the lower yoke 30 and upper yoke 40 and the bobbin/presser member 50 around which the coil 60 is wound are simultaneously positioned to the base 10", the assembly task can be performed more simply and with higher accuracy than in the manner in which they are assembled by being individually positioned. Additionally, since the bobbin 51 and the pressing portions 52 and 53 are integrally formed, man-hours for assembly can be shortened, and, in addition, the parts count can be reduced, the management cost of components can be lowered, and therefore device cost can be lowered more than in the conventional manner in which they are formed as individually separated components.

In the state in which the electromagnetic actuator 100 has been attached to the base 10" as mentioned above, the rotor 20 is rotatably supported by the base 10" (supporting shaft 11) and the bobbin/presser member 50 (pressing portion 52) so as not to fall off as shown in FIG. 9, and the driving pin 23 thereof extends through the notch hole 15 to the blade chamber W formed between the base 10" and the back plate 120.

As shown in FIG. 8, the back plate 120 has an exposure opening 120a corresponding to the opening 10a of the base 10", a circular hole 120b through which the supporting shaft 16 passes, a long hole 120c through which the driving pin 23 passes, and a hole 120d through which a screw 130 passes. Also, after the diaphragm blade 110 is disposed in the blade chamber W, the back plate 120 is fastened to the back side of the base 10" by means of the screw 130.

Figure 10:
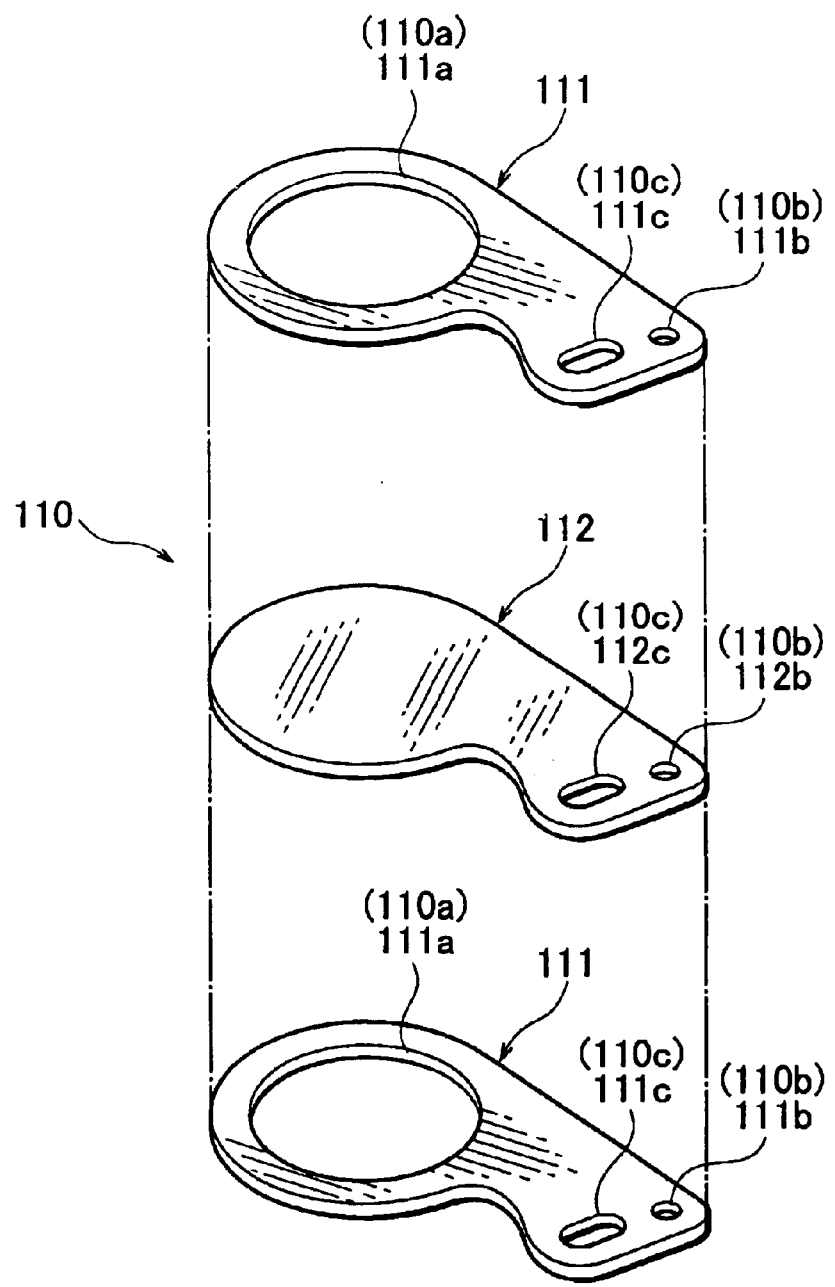
FIG. 10 is an exploded perspective view of the diaphragm blade serving as a part of the camera blade driving device shown in FIG. 8 and FIG. 9.

As shown in FIG. 8 and FIG. 10, the diaphragm blade 110 is formed such that a film-like ND filter 112 is placed between a pair of blades 111 made from plastic or metallic material, and they are unitedly joined to each other by bonding, welding, or caulking. The diaphragm blade 110 has an aperture 110a larger in hole diameter than the exposure opening 10a, a circular hole 110b through which the supporting shaft 16 passes, and a long hole 110c through which the driving pin 23 passes.

The pair of blades 111 have an aperture 111a that defines the aperture 110a, a circular hole 111b that defines the circular hole 110b, and a long hole 111c that defines the long hole 110c. The ND filter 112 is formed to have the same outline as that of the pair of blades 111, and has a circular hole 112b that defines the circular hole 110b, and a long hole 112c that defines the long hole 110c. The ND filter 112 is an optical neutral-density filter that decreases the amount of light nearly without producing a color variation. ND is an abbreviation for neutral density.

Since the diaphragm blade 110 has a layered structure formed by the pair of blades 111 and the ND filter 112 that have the same outline in this way, mechanical strength rises, the ND filter 112 can be prevented from being scratched, a blanking die or the like can be shared, and manufacturing costs can be reduced.

Figure 11A:
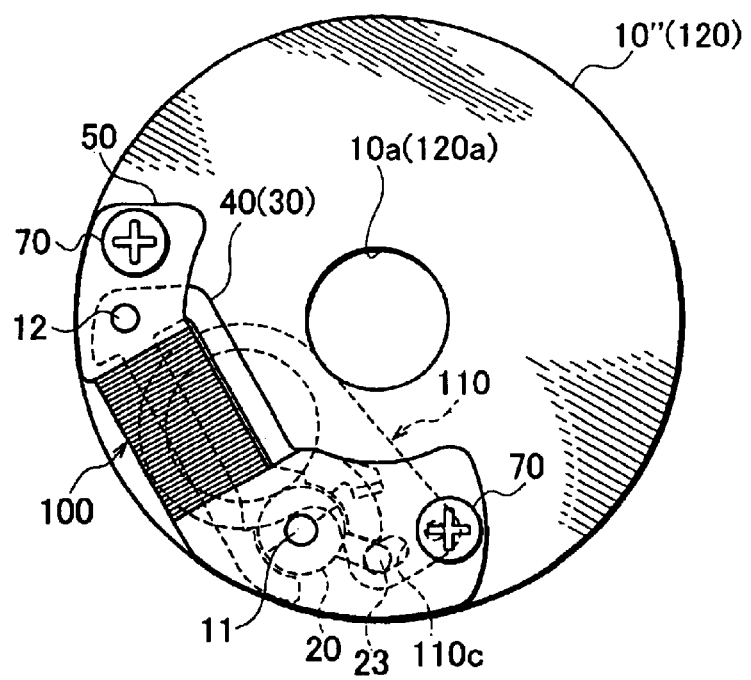
FIG. 11A and FIG. 11B explain the operation of the camera blade driving device shown in FIG. 8 and FIG. 9, FIG. 11A being a plan view that shows a state in which the diaphragm blade is at a non-stopping-down position where an exposure opening is not stopped down, FIG. 11B being a plan view that shows a state in which the diaphragm blade is at a stopping-down position where the exposure opening is stopped down.
Figure 11B:
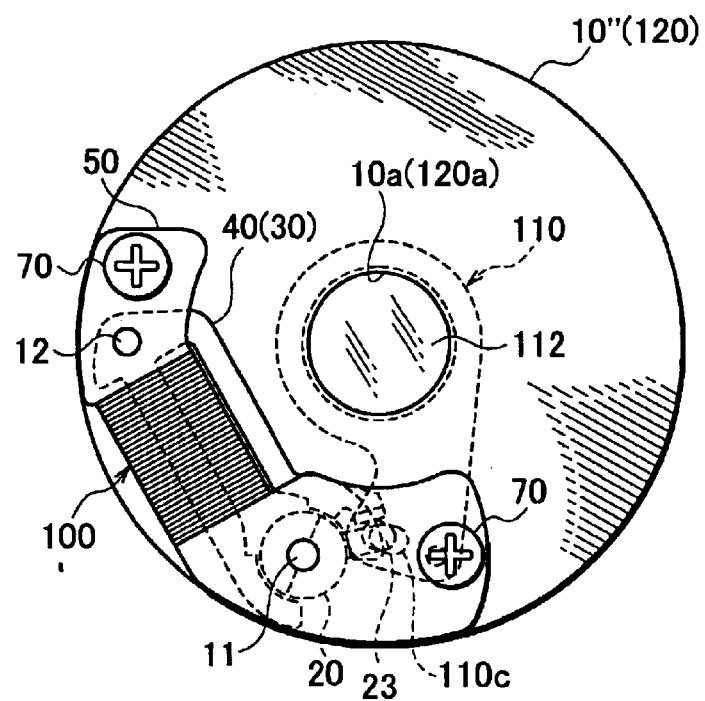

When an electric current is passed through the coil 60, and the rotor 20 is rotated in the state where the diaphragm blade 110 is rotatably supported by the supporting shaft 16 in the blade chamber W as shown in FIG. 9, the diaphragm blade 110 constructed as mentioned above moves between a non-stopping-down position deviating from the opening 10a as shown in FIG. 11A and a stopping-down position facing the opening 10a where the amount of light is reduced as shown in FIG. 11B through the driving pin 23.

In this camera blade driving device, the electromagnetic actuator 100 is employed as a driving source, and therefore the cost of the entire device can be reduced. Additionally, for example, when the electromagnetic actuator 100 is replaced with another, the replacement task can be performed more simply and more easily than in the conventional manner, because the number of constituent parts is smaller than in the prior art device.

In this embodiment, the aperture 110a of the diaphragm blade 110 is made larger in hole diameter than the opening 10a of the base 10". However, this may be formed as a diaphragm aperture that is smaller in hole diameter than the opening 10a. If so, when the diaphragm blade is at the stopping-down position facing the opening 10a, the amount of light passing through the opening 10a is adjusted (decreased) both by the operation of the diaphragm aperture and by the operation of the ND filter.

FIG. 12 through FIGS. 14A and 14B show another embodiment of the camera blade driving device (camera diaphragm device) that has the electromagnetic actuator 100 shown in FIG. 1. Except that the diaphragm blade 110' and the back plate 120' have been varied, this embodiment has the same structure as the embodiment shown in FIG. 8 and FIG. 9. Therefore, in this embodiment, the same reference characters are given the same constituent parts as those in the foregoing embodiment, and a description is omitted.

Figure 12:
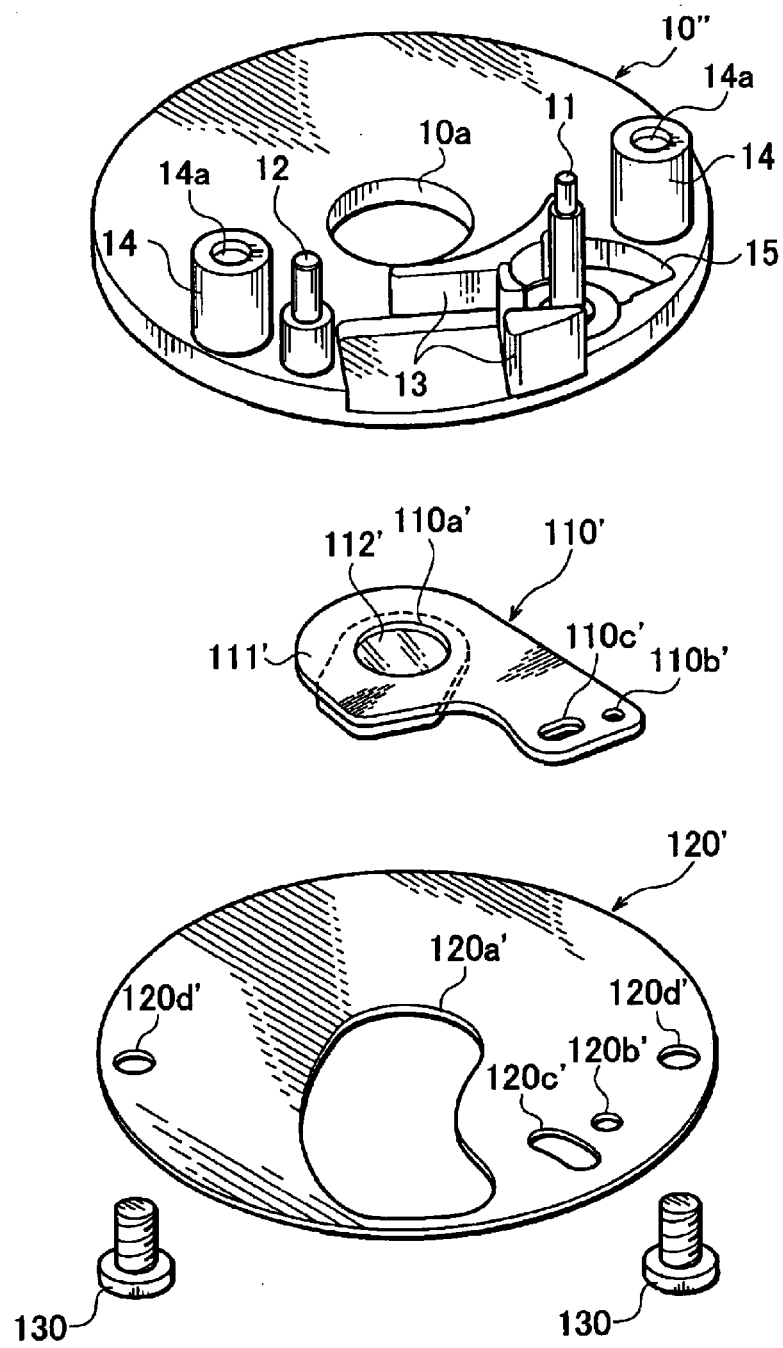
FIG. 12 shows another embodiment of the camera blade driving device according to the present invention, being an exploded perspective view that shows the diaphragm blade serving as a part of the device and that shows a structure in the vicinity thereof.
Figure 13:
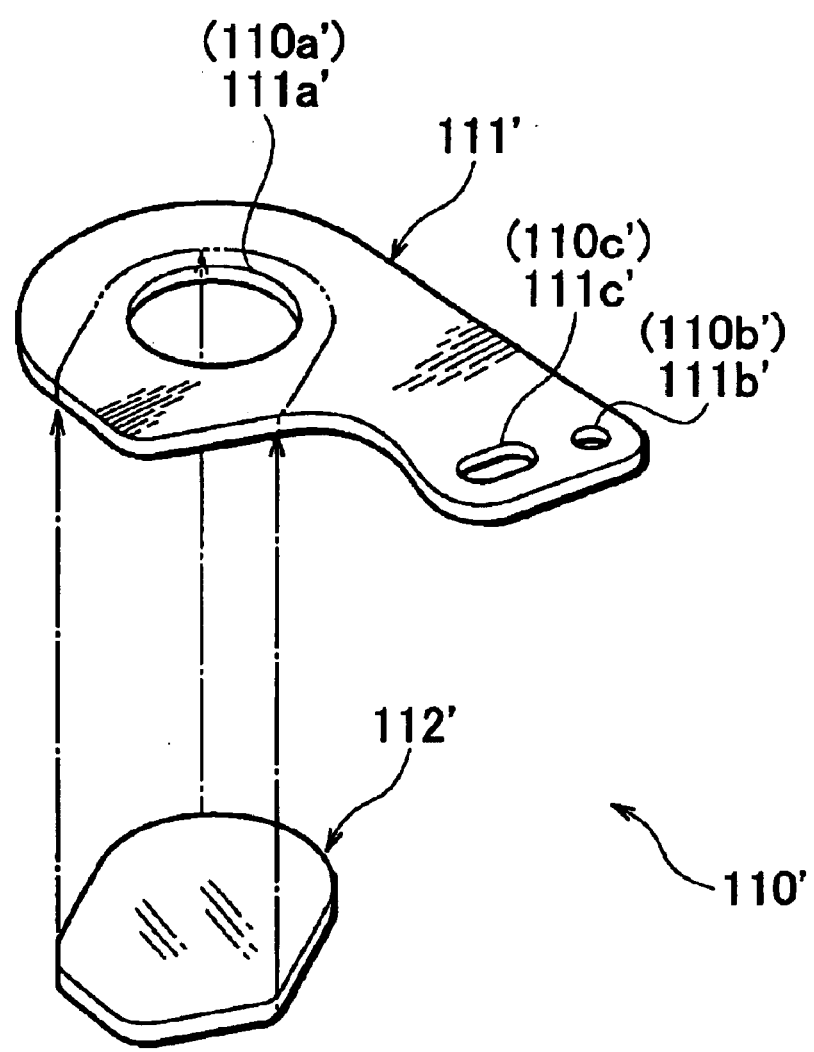
FIG. 13 is an exploded perspective view of the diaphragm blade serving as a part of the camera blade driving device shown in FIG. 12.

That is, in this camera blade driving device, the diaphragm blade 110' is formed such that a film-like ND filter 112' is joined to the back side of a blade 111' made from plastic or metallic material by bonding, welding, or caulking as shown in FIG. 12 and FIG. 13. The diaphragm blade 110' has a diaphragm aperture 110a' smaller in hole diameter than the exposure opening 10a, a circular hole 110b' through which the supporting shaft 16 passes, and a long hole 110c' through which the driving pin 23 passes.

As shown in FIG. 13, the blade 111' has an aperture 111a' that defines the diaphragm aperture 110a', a circular hole 111b' that defines the circular hole 110b', and a long hole 111c' that defines the long hole 110c'.

The ND filter 112' is formed to have a size large enough to cover the aperture 111a', and is stuck onto the rear face of the blade 111'.

As shown in FIG. 12, the back plate 120' has a curved, long-hole-shaped opening 120a' that defines an exposure-opening part corresponding to the opening 10a of the base 10" and a clearance part of the ND filter 112', a circular hole 120b' through which the supporting shaft 16 passes, a long hole 120c' through which the driving pin 23 passes, and a hole 120d' through which the screw 130 passes. Also, after the diaphragm blade 110' is disposed in the blade chamber W, the back plate 120' is fastened to the back face of the base 10" by means of the screw 130.

Since the diaphragm blade 110' is formed by the single blade 111' and the ND filter 112' stuck only onto the area covering the diaphragm aperture 110a' in this way, the diaphragm blade 110' is made smaller in thickness and in weight than the aforementioned diaphragm blade 110. Additionally, the opening 120a' that also defines the clearance part of the ND filter 112' is formed in the back plate 120', and therefore, when the diaphragm blade 110' and the back plate 120' are attached to the base 10", they can be assembled while being brought nearer to each other, and therefore the whole of the diaphragm device can be made thinner.

Figure 14A:
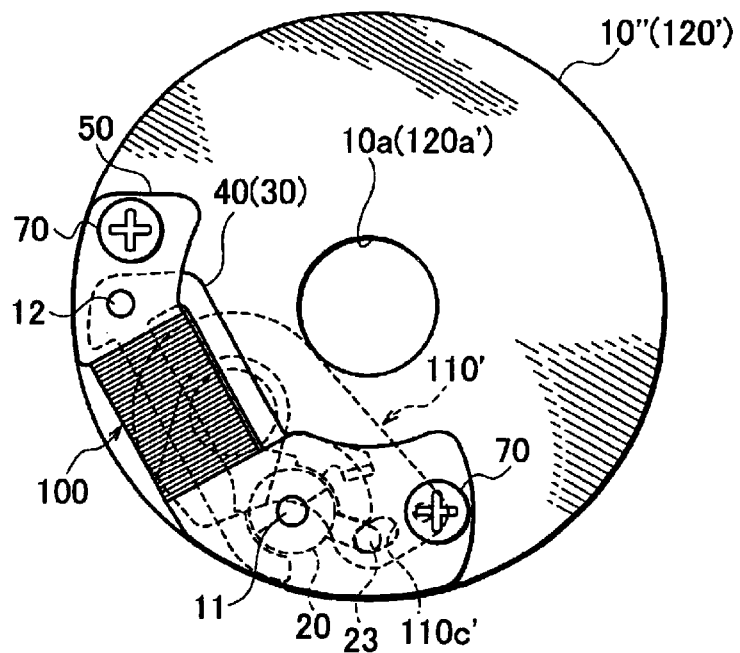
FIG. 14A and FIG. 14B explain the operation of the camera blade driving device shown in FIG. 12, FIG. 14A being a plan view that shows a state in which the diaphragm blade is at a non-stopping-down position, FIG. 14B being a plan view that shows a state in which the diaphragm blade is at a stopping-down position.
Figure 14B:
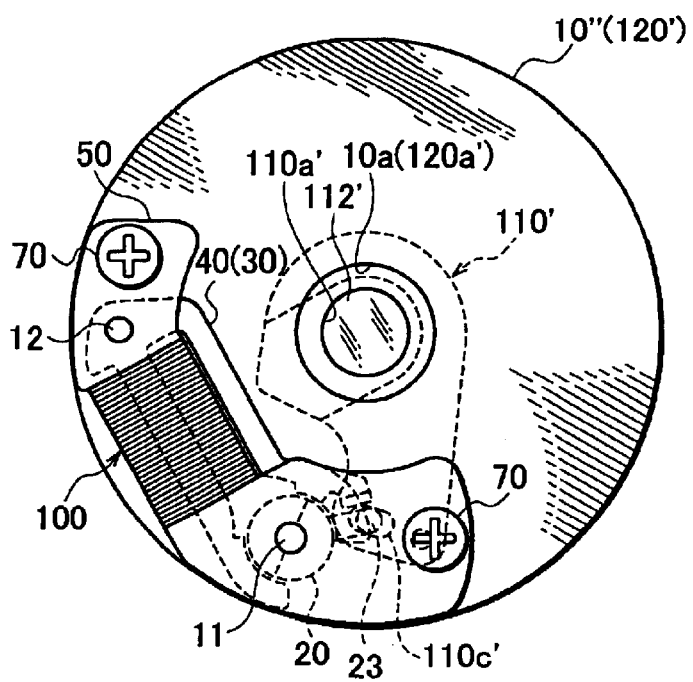

As in the aforementioned embodiment, when an electric current is passed through the coil 60, and the rotor 20 is rotated in a state where the diaphragm blade 110' is rotatably supported by the supporting shaft 16 in the blade chamber W, the diaphragm blade 110' constructed as mentioned above moves between a non-stopping-down position deviating from the opening 10*a* as shown in FIG. 14A and a stopping-down position facing the opening 10*a* where the amount of light is reduced as shown in FIG. 14B through the driving pin 23.

Likewise, in this camera blade driving device, the electromagnetic actuator 100 is employed as a driving source, and therefore the cost of the entire device can be reduced. Additionally, for example, when the electromagnetic actuator 100 is replaced with another, the replacement task can be performed more simply and more easily than in the conventional manner, because the number of constituent parts is smaller than in the prior art device.

Additionally, in this embodiment, the diaphragm aperture 110*a*' of the diaphragm blade 110' is made smaller in hole diameter than the opening 10*a* of the base 10". However, this may be formed as an aperture that is larger in hole diameter than the opening 10*a*. If so, when the diaphragm blade is at the stopping-down position facing the opening 10*a*, the amount of light passing through the opening 10*a* is adjusted (decreased) only by the operation of the ND filter.

FIG. 15 through FIGS. 16A and 16B show still another embodiment of the camera blade driving device (camera diaphragm device) that has the electromagnetic actuator 100 shown in FIG. 1. Except that the diaphragm blade 110" has been varied, this embodiment has the same structure as the embodiment shown in FIG. 8 and FIG. 9. Therefore, in this embodiment, the same reference characters are given the same constituent parts as those in the foregoing embodiment, and a description is omitted.

Figure 15:
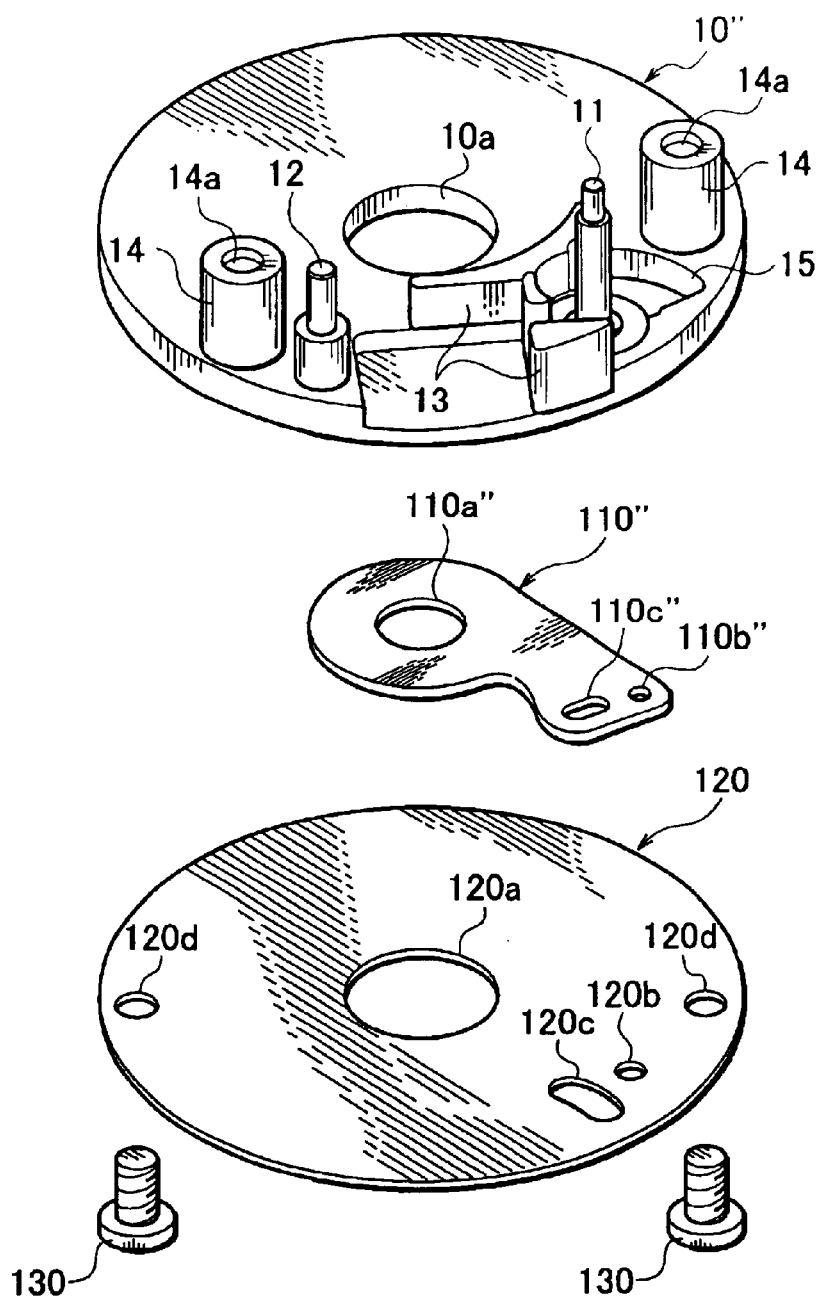
FIG. 15 shows still another embodiment of the camera blade driving device according to the present invention, being an exploded perspective view that shows the diaphragm blade serving as a part of the device and that shows a structure in the vicinity thereof.
Figure 16A:
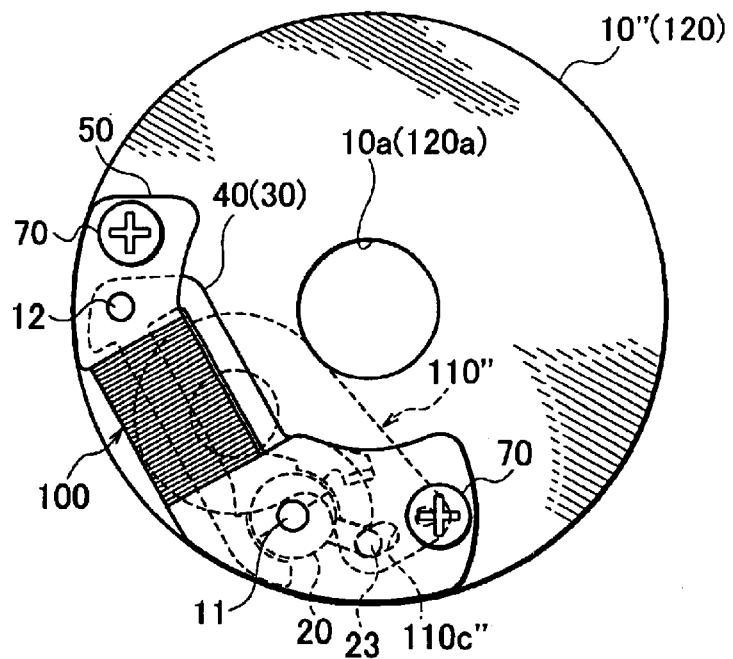
FIG. 16A and FIG. 16B explain the operation of the camera blade driving device shown in FIG. 15, FIG. 16A being a plan view that shows a state in which the diaphragm blade is at a non-stopping-down position, FIG. 16B being a plan view that shows a state in which the diaphragm blade is at a stopping-down position.
Figure 16B:
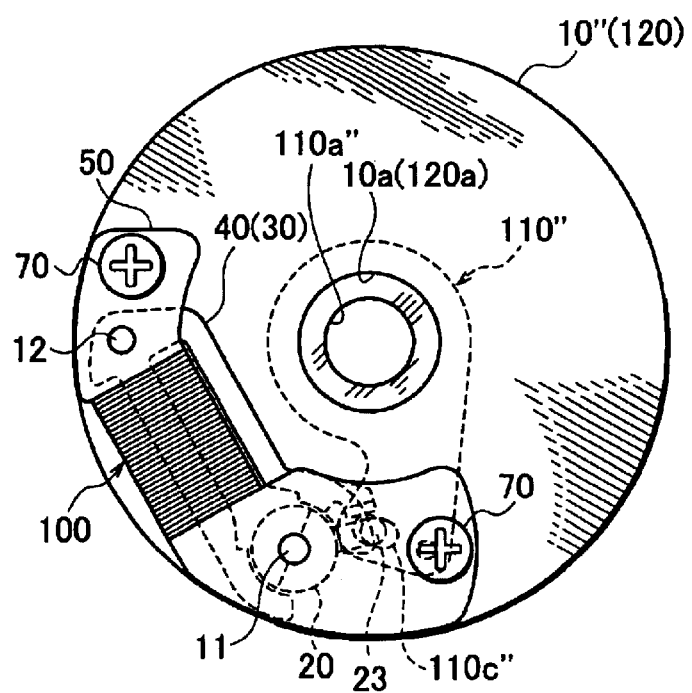

That is, in this camera blade driving device, the diaphragm blade 110" is made from plastic or metallic material as shown in FIG. 15, FIGS. 16A and 16B, and has a diaphragm aperture 110*a*" smaller in hole diameter than the exposure opening 10*a*, a circular hole 110*b*" through which the supporting shaft 16 passes, and a long hole 110*c*" through which the driving pin 23 passes.

As in the aforementioned embodiment, when an electric current is passed through the coil 60, and the rotor 20 is rotated in the state where the diaphragm blade 110" is rotatably supported by the supporting shaft 16 in the blade chamber W, the diaphragm blade 110" constructed as mentioned above moves between a non-stopping-down position deviating from the opening 10*a* as shown in FIG. 16A and a stopping-down position facing the opening 10*a* where the amount of light is reduced as shown in FIG. 16B through the driving pin 23.

Likewise, in this camera blade driving device, the electromagnetic actuator 100 is employed as a driving source, and therefore the cost of the entire device can be reduced. Additionally, for example, when the electromagnetic actuator 100 is replaced with another, the replacement task can be performed more simply and more easily than in the conventional manner, because the number of constituent parts is smaller than in the prior art device.

In the aforementioned embodiments, the electromagnetic actuator 100 having the lower yoke 30 and upper yoke 40 employs the bobbin/presser member 50 in which the bobbin 51 and the pressing portions 52 and 53 are integrally formed. However, without being limited to this, a structure including a single yoke may be employed as the structure of the present invention.

Additionally, in the aforementioned embodiments, the diaphragm blade driven by the electromagnetic actuator 100 is the single diaphragm blade 110, 110', or 110". However, without being limited to this, there may be employed a pair of diaphragm blades or three or more diaphragm blades that stop down the opening 10*a* by coming closer to each other and release the stopping-down of the opening 10*a* by being separated from each other, and the electromagnetic actuator 100 may be employed as a driving source of these diaphragm blades.

As described above, according to the electromagnetic actuator and the camera blade driving device according to the present invention, since the pressing portion that presses the yoke against the base and supports the rotor is formed integrally with the bobbin around which the magnetizing coil is wound, the parts count is reduced, and, proportionally thereto, man-hours or labor hours to handle the components can be saved, and the assembly task can be simplified, and therefore the structure can be made simpler, and costs can be lowered more than in the conventional manner in which the components are individually formed.

What is claimed is:

1. An electromagnetic actuator comprising:
   a rotor magnetized to have a plurality of poles;
   a base rotatably supporting the rotor;
   a yoke having a plurality of magnetic pole portions that are formed so as to face an outer peripheral surface of the rotor and that generate different magnetic poles;
   a magnetizing coil; and
   a bobbin/presser member that is disposed on an outer periphery of the yoke, around which the coil is wound, and with which a pressing portion for pressing the yoke against the base and for supporting the rotor is formed integrally.

2. The electromagnetic actuator of claim 1, wherein:
   the yoke has two magnetic pole portions and is shaped substantially like the letter U including a straight part that has one of the two magnetic pole portions at an end thereof, and
   the bobbin has an engagement hole into which the straight part is fitted.

3. The electromagnetic actuator of claim 1, wherein the pressing portion is formed so as to extend from both ends of the bobbin.

4. The electromagnetic actuator of claim 1, wherein the pressing portion is formed so as to extend from one end of the bobbin.

5. An electromagnetic actuator comprising:
   a base;
   a rotor rotatably supported by the base and magnetized to have a plurality of poles;
   a nearly U-shaped yoke disposed on the base so as to face an outer peripheral surface of the rotor;
   a magnetizing coil; and
   a bobbin including a portion around which the coil disposed on one side of the yoke is wound and a portion holding the yoke and the rotor so as not to fall off the base.

6. A camera blade driving device comprising:
   a base having an exposure opening;
   a shutter blade that is rotatably supported by the base and that opens and closes the opening; and
   an electromagnetic actuator including a rotor that is magnetized to have a plurality of poles and that is rotatably supported by the base, a yoke having a plurality of magnetic pole portions that are formed so as to face an outer peripheral surface of the rotor and that generate different magnetic poles, a magnetizing coil, and a bobbin/presser member which is disposed on an outer periphery of the yoke, around which the coil is wound, and with which a pressing portion for pressing the yoke against the base and for supporting the rotor is formed integrally, the electromagnetic actuator driving the shutter blade.

7. The camera blade driving device of claim 6, wherein the yoke has two magnetic pole portions and is shaped substantially like the letter U including a straight part that has one of the two magnetic pole portions at an end thereof, and the bobbin has an engagement hole into which the straight part is fitted.

8. The camera blade driving device of claim 6, wherein the pressing portion is formed so as to extend from both ends of the bobbin.

9. The camera blade driving device of claim 6, wherein the pressing portion is formed so as to extend from one end of the bobbin.

10. A camera blade driving device comprising:

a base having an exposure opening;

a diaphragm blade that is rotatably supported by the base and that limits an amount of light passing through the opening; and an electromagnetic actuator including a rotor that is magnetized to have a plurality of poles and that is rotatably supported by the base, a yoke having a plurality of magnetic pole portions that are formed so as to face an outer peripheral surface of the rotor and that generate different magnetic poles, a magnetizing coil, and a bobbin/presser member which is disposed on an outer periphery of the yoke, around which the coil is wound, and with which a pressing portion for pressing the yoke against the base and for supporting the rotor is formed integrally, the electromagnetic actuator driving the diaphragm blade.

11. The camera blade driving device of claim 10, wherein:

the yoke has two magnetic pole portions and is shaped substantially like the letter U including a straight part that has one of the two magnetic pole portions at an end thereof, the bobbin has an engagement hole into which the straight part is fitted, and the diaphragm blade has a blade defining an aperture with a predetermined hole diameter and an ND filter which is joined to the blade so as to cover at least the aperture and by which an amount of light is reduced.

12. The camera blade driving device of claim 11, wherein the diaphragm blade has a pair of blades, and the ND filter is joined while being placed between the pair of blades.

13. The camera blade driving device of claim 11, wherein the ND filter is joined to a surface on one side of the blade.

14. The camera blade driving device of claim 10, wherein:

the yoke has two magnetic pole portions and is shaped substantially like the letter U including a straight part that has one of the two magnetic pole portions at an end thereof, the bobbin has an engagement hole into which the straight part is fitted, and the diagram blade has a diaphragm aperture smaller in hole diameter than the exposure opening.

15. The camera blade driving device of claim 10, wherein the pressing portion is formed so as to extend from both ends of the bobbin.

* * * * *